Patented Mar. 1, 1932

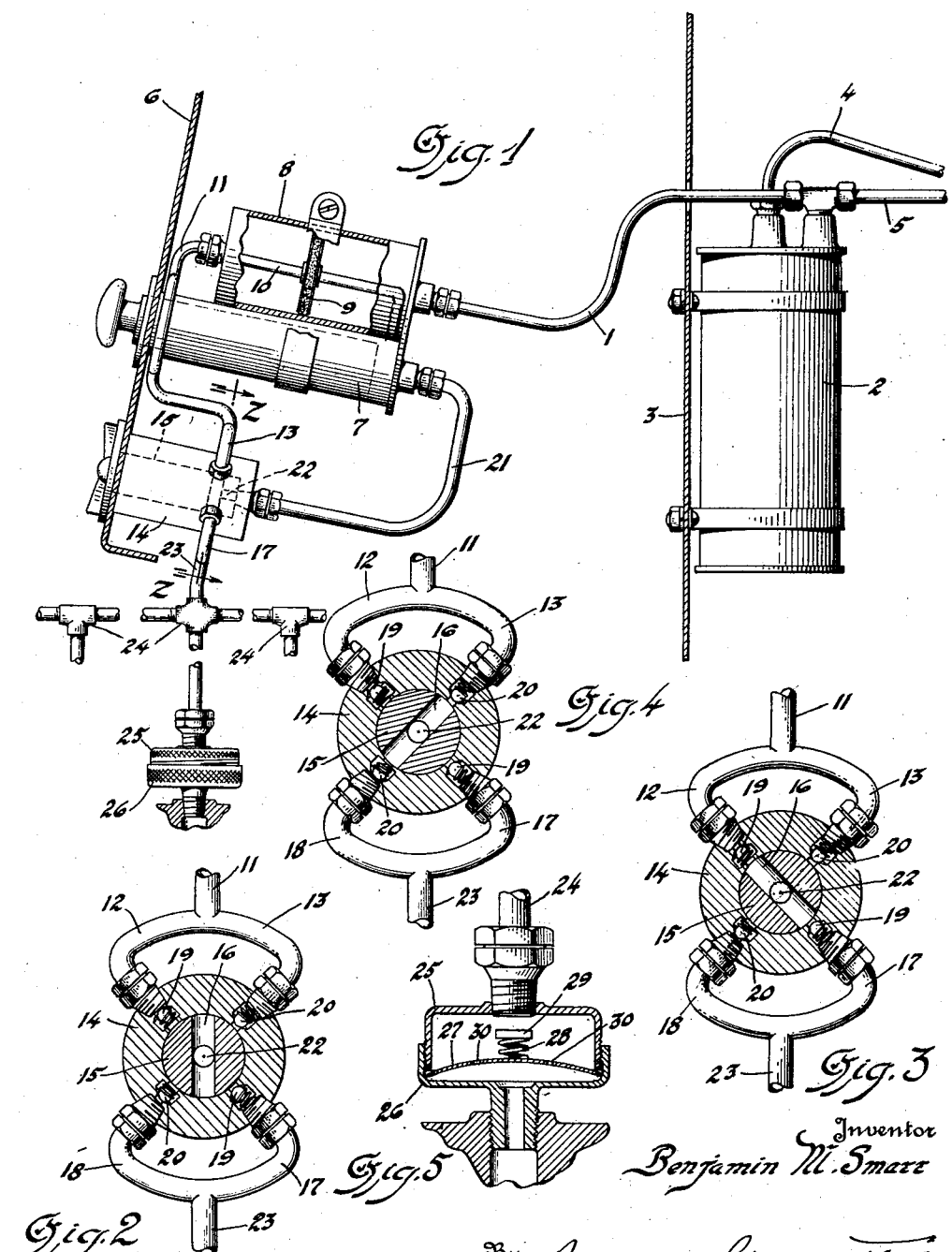

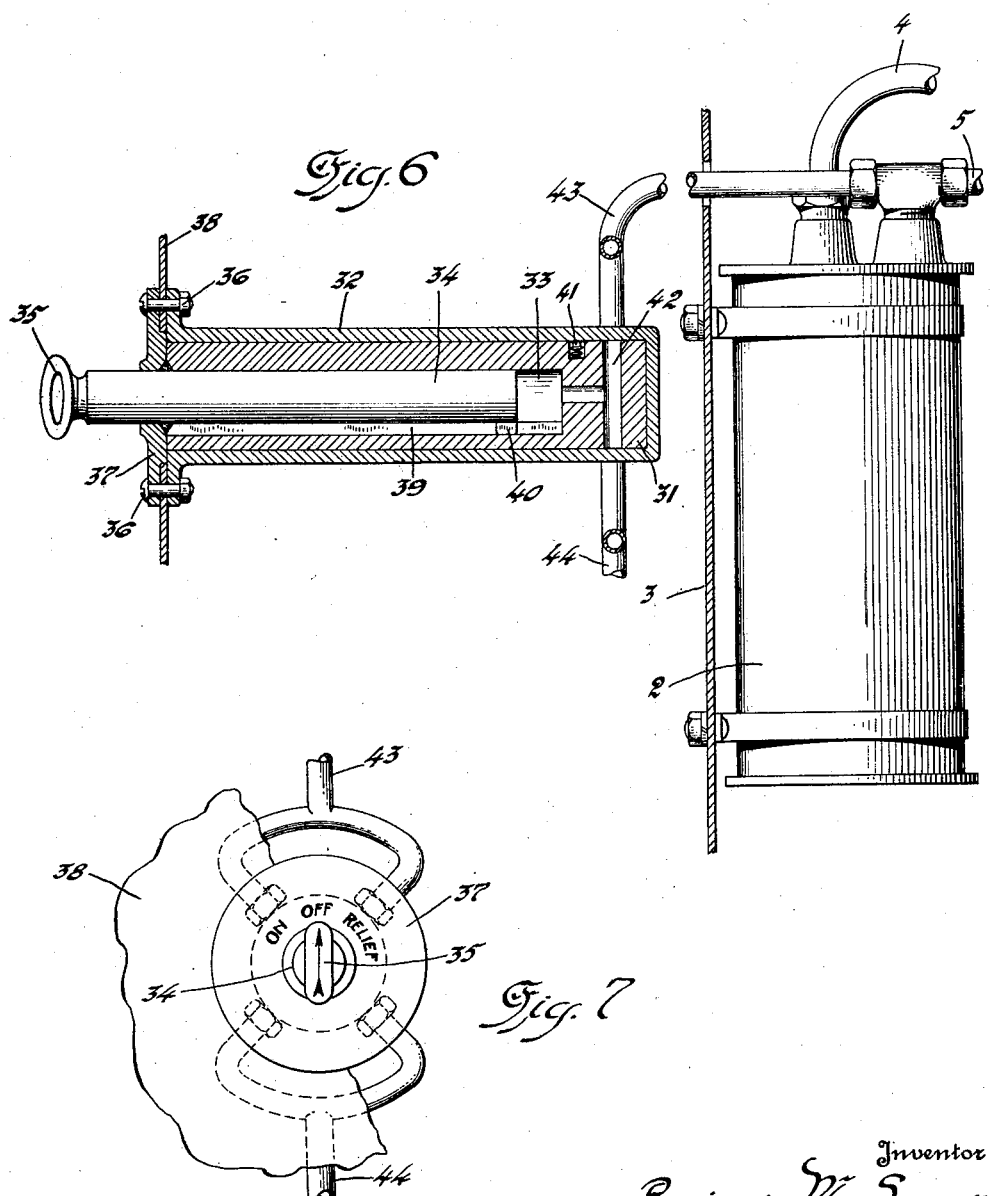

1,848,082

UNITED STATES PATENT OFFICE

BENJAMIN M. SMARR, OF DETROIT, MICHIGAN, ASSIGNOR TO GENERAL MOTORS CORPORATION, OF DETROIT, MICHIGAN, A CORPORATION OF DELAWARE

CHASSIS LUBRICATING SYSTEM

Application filed September 30, 1926. Serial No. 138,670.

This invention relates to lubricating systems for automobiles or the like, particularly to force feed devices, wherein the various parts of a chassis requiring lubrication may be supplied from a common source, with a minimum of effort.

More specifically the invention has to do with a manually controlled central lubricating system wherein control parts located at a convenient point may be actuated to cause several parts to be supplied at the same time and in a single operation with lubricant under pressure, each part receiving its individual measured charge predetermined according to its character and requirements and independently of any amount supplied to other parts.

One of the primary objects of the invention is to provide a system wherein lubricant is sent to the part or parts to be lubricated under pressure, either through power diverted from the vehicle-propelling engine or built up with a hand-operated pump or by the combined action of both pressure sources, one augmenting the other, whereby the old grease and accumulated dirt is forced out of the part and a positive delivery of a fresh supply is insured.

Another object is to provide an automatic metering device which after any one particular part or bearing of the group has received its predetermined required amount of lubricant, prevents further flow to that part, thereby obviating unnecessary waste and leakage and serving to direct the grease to other bearings or parts needing lubrication.

A further object of the invention is to provide a device whereby excess lubricant or that remaining in the conduits or lines leading to the various parts after all have received their measured charge may be returned to the supply reservoir and stored until the next greasing operation.

A further object is to provide a novel control for the system. Other objects will be apparent from the specification.

In the drawings, Figure 1 is a somewhat diagrammatic elevation, partly in section, showing a desirable arrangement and relation of parts.

Figures 2, 3, and 4 are transverse sectional views taken on line Z—Z of Figure 1, each showing a different position of adjustment of a multiple valve governing lubricant flow.

Figure 5 is a vertical sectional view of the automatic control for each individual bearing or point of lubrication.

Figure 6 is a sectional view of a modified form of manual control for the system.

Figure 7 is a front elevation of the manual control shown in Figure 6, as it would appear on the automobile instrument panel.

It is common practice in the construction of internal combustion engines for automobiles to employ a pump driven from the engine, for supplying crankcase oil under pressure to the engine bearings, and the present chassis lubricating system is designed for use in conjunction with such engine lubricating system. To this end, the pressure pump may either supply crankcase oil direct to the chassis bearings or act on an independent chassis lubricant supply.

A system for sending to the bearings lubricant other than engine crankcase oil but under influence of pump pressure on such crankcase oil is illustrated in Fig. 1. In this figure the reference numeral 1 indicates a pressure line leading from the engine oil pump or from any convenient point in the pressure lines of the conventional engine force feed lubricating system. Any convenient expedient may be used to tap the pressure line or conduit 1 in the force feed system of the engine. For example, there is shown in the drawing an oil filter 2 mounted, according to usual practice, on the dashboard 3 and having a pressure line 4 leading from the engine pump and a return line 5 for filtered oil, the pressure line 1 being tapped in at the filter outlet. According to the present invention, the instrument board or panel 6 may have mounted thereon the hand-operated booster pump 7 carrying a piston cylinder or storage reservoir 8 for the chassis lubricant supply and with which the pressure line 1 communicates. The separate lubricant supply for the chassis parts which may be either oil or grease, is contained within the reservoir 8 on one side of the piston 9, slidable on guide rod 10 and the engine oil under pressure delivered through the line 1 on the opposite side of the piston tends to move the piston to discharge the supply of lubricant through the line or conduit 11, which terminates in suitable branches or conduits 12 and 13. The rotary or multiple valve, also mounted upon the instrument panel 6, consists of a housing 14 and a relatively rotatable interior body 15, which body has a radial bore 16, adapted upon adjustment to connect either the branch passageway 12 with the branch passageway 17, or the branch passageway 18 with the branch passageway 13. Check valves 19, as for instance, spring-pressed balls, limit the flow of lubricant through passageway 12—17 to the direction of the bearings or parts to be lubricated, while similar check valves 20 limit passageway 13—18 to the reverse direction of flow. The conduit 21 leading from the booster pump or compressor 7 is in constant communication through the axial bore 22 with the radial bore 16 of the rotary valve body 15, and therefore, the operation of the hand compressor will affect the flow in either direction.

The conduits 17 and 18 merge into conduit 23, leading to the several bearings or series of parts to be lubricated, by means of a number of branches indicated at 24, only one bearing connection being shown.

Each part or bearing to be lubricated is provided with a fitting or chambered housing, comprising two cups 25 and 26 threaded one within the other. Between the two cups is secured the diaphragm or flexible wall 27, preferably constructed of spring steel, dividing the chambered housing into inlet and outlet compartments. Within the inlet side, the diaphragm carries a light spring 28 which exerts its tension against a leather washer or disc 29 to maintain the inlet closed when the system is not in operation. Holes 30 in the diaphragm provide communication for lubricant flow between the two compartments. Such fitting controls the amount of lubricant to be supplied the bearing. That is, the number and size of the holes in the diaphragm wall limits the lubricant flow and when the pressure supplies lubricant in excess of the limit, the diaphragm will flatten out against the bottom of the cup 26, thereby closing the openings 30 and preventing further flow thru the outlet to the bearing. It will be obvious that for different sizes of bearings requiring varying amounts of lubricant, the closing point may be governed by changing the capacity of the communicating openings 30, or in lieu thereof, the size or capacity of the fitting itself, may be varied.

Normally, the multiple valve element 15 is in the closed position shown in Figure 2 preventing lubricant flow in either direction. At such time, any lubricant which may have been left in the branch conduits 24 since a previous greasing operation, is held against gravity flow to the bearings by the spring pressed washer 29 closing the inlet to each fitting. The necessary periodic greasing of the chassis parts, may be performed at any time, as for instance, when the automobile is in motion, and is entirely controlled at the driver's seat. The action of the system being almost entirely automatic, its control from the driver's standpoint is quite simple. The valve element 15 at the instrument panel will be turned to the flow position indicated in Figure 3 placing conduits 12—17 in communication. Pump pressure, which may vary with different engine speeds from two to fifty pounds per square inch, either supplying crank-case oil direct or acting on the piston 9, in a few seconds' time completely charges the system with lubricant. The driver, therefore, at once manipulates the compressor or booster pump 7, by moving its handle to reciprocate a plunger within the compressor, which will be constructed to develop an additional pressure of several hundred pounds. As soon as the increased flow into the cup 25 exceeds the capacity of the openings 30 the wall or diaphragm 27 is instantly flattened or moved against the bottom of the fitting, forcing the lubricant on the outlet side to the bearing and preventing further flow. As before stated, the capacity of the openings 30 controls the supply of lubricant delivered to any particular bearing. Those fittings at bearings requiring but little lubrication will be provided with small openings in the diaphragm, causing such fittings to close in advance of fittings at larger bearings. Closure at any bearing concentrates or directs the flow under pressure to the remaining bearings and when all have received their supply of lubricant, the flow is entirely cut off, and the resistance to the booster pump operation indicates this condition to the automobile driver. The valve is then turned to the reverse flow position shown in Figure 4, to place the conduits 13—18 in communication. Upon operation of the booster, pressure in the system is relieved and excess lubricant and pump contents are returned to the supply reservoir 8 or engine lubricating system as the case may be, until the system is to be recharged. With the pressure relieved the diaphragm reassumes its normal shape and the spring pressed washer 29 closes the inlet to preclude pump suction withdrawing the lubricant charge from the bearing.

The return of the valve element 15 to closed position completes the greasing operation, and thereafter the washer 29 prevents seepage and waste by gravity flow of lubricant that may not have been removed from the system during the reverse flow operation. It is obvious that efficient lubrication of the chassis parts is not dependent upon reverse flow, and such reversal could be completely neglected or eliminated entirely from the system. In such event the pressure in the system would soon relieve itself and permit return of the diaphragm and spring pressed washer.

Figures 6 and 7 show the booster pump and multiple valve, constituting the manual control of the system, combined in a single unit. In this case, the rotary valve element or cylindrical body 31, within the housing 32, has an enlarged axial bore 33 in which reciprocates the plunger 34, having a handle 35. Studs or rivets 36 fasten the housing 32 and closure plate 37 to the instrument panel 38. A longitudinal slot 39 in the side of the axial bore 33 provides a guide for the key 40 at the end of the plunger 34, so that when the handle 35 is rotated the rotary valve element 31 is carried with it.

Locking means, such as a spring pressed ball 41, carried by the rotary element and adapted to engage in depressions in the housing 32, may be provided to hold the parts in adjusted position. For convenience, the plate 37 preferably carries indications corresponding to valve adjustment positions and an arrow on the handle 35, points to the location of the radial bore 42. The parts are shown in the "off" position with the plunger partly pulled out. Figure 6 also illustrates the connection of the chassis lubricating system directly with the engine lubricating system. The conduit 43 providing communication between the systems and conduit 44 leading to the several bearings, are each provided with branch passageways at the multiple valve, corresponding to those shown in the preceding figures, and the operation and control of the system is otherwise as before described.

While the parts and arrangement have been described more or less specifically, it is to be understood that such modifications may be made as come within the scope of the appended claims.

Having described my invention, I claim:

1. In a lubricating system, a passageway for lubricant under pressure, a chamber in said passageway, a flexible diaphragm dividing said chamber into two compartments and having restricted openings providing communication between said compartments, said diaphragm being adapted for flexing movement into contact with the wall of the chamber to close the passageway when the pressure in one compartment exceeds that of the other.

2. In a device of the character described, a passageway for fluid under pressure, a chamber in said passageway having inlet and outlet openings, a flexible wall dividing said chamber into two compartments, and having restricted openings providing communication between said compartments and a spring pressed valve carried by the wall and adapted to close the inlet opening when its spring tension exceeds the pressure in said passageway, said wall being adapted to flex and close the outlet when the pressure supplies fluid in excess of the capacity of said restricted openings.

3. In a lubricating system, a passageway for lubricant under pressure, a chamber in said passageway, and a flexible wall dividing said chamber into two compartments having restricted communication therebetween, said passageway being closed when the wall is flexed into contact with a wall of said chamber by pressure supplying lubricant in excess of the capacity of the restricted communication.

4. In a device of the character described, a passageway for fluid under pressure, a chamber located in said passageway, having inlet and outlet communication therewith, a fluid pressure controlled wall dividing said chamber into inlet and outlet compartments, said compartments having restricted communication therebetween, a closure element carried by the wall adapted to maintain the inlet closed against gravity fluid flow when the device is inoperative, said wall adapted to maintain the outlet closed when the pressure supplies fluid at a higher rate of flow than the predetermined capacity of the restricted intercommunication between the two compartments.

5. In a lubricating system, the combination with a series of parts to be lubricated, of a supply of lubricant under pressure common to each part of said series, means to vary the pressure on the lubricant supply, and pressure controlled means at each part of said series to be lubricated including a chambered housing and a flexible member in said housing having an opening through which the lubricant flows through the housing to the part to be lubricated, and which flexible member is adapted to be flexed when the pressure exceeds a predetermined value into contact with a wall of said housing to close said opening and prevent further lubricant flow.

6. In a lubricating system, the combination with a series of parts to be lubricated, of a source of lubricant under pressure communicating with each of said series of parts, means to increase the pressure on the lubricant flow and an automatically operated valve member at each part including a chambered housing, a concavo-convex wall located within said housing and having openings for the passage of lubricant, said wall being movable into flat contact with a wall of the housing to close the openings when the pressure on the lubricant exceeds a predetermined value.

7. A lubricating system including, in combination, a source of lubricant under pressure, a chambered housing communicating with said source of lubricant, a flexible diaphragm in said housing having openings therein to permit lubricant flow past the diaphragm, and auxiliary pressure means to increase the lubricant flow beyond the capacity of said openings whereupon said diaphragm is flexed and further lubricant flow is prevented.

8. A lubricating system, including in combination, a chambered housing, having an inlet communicating with a source of lubricant and an outlet communicating with a part to be lubricated, a normally closed closure member for said inlet, a source of comparatively low pressure adapted to open said member to admit lubricant within said chambered housing, a normally open closure member for said outlet, and a source of comparatively high pressure adapted to force lubricant admitted by said first mentioned closure member thru the outlet and to close the said second mentioned closure member against the continued flow of lubricant.

9. In a lubricating system, the combination of a number of parts to be lubricated, a common supply of lubricant communicating with each part, a source of pressure adapted to force the lubricant to the several parts, and control means for each of said parts, including a chambered housing through which the lubricant flows, a flexible diaphragm in said housing having openings therein accommodating the lubricant flow under said source of pressure, and a supplemental source of pressure adapted to increase the lubricant flow, whereby upon failure of said openings to accommodate such increased flow, the diaphragm is flexed to close communication to such part and direct the lubricant flow to the remainder of the parts.

10. A lubricating system including in combination a lubricant reservoir, a conduit connecting the reservoir to a part to be lubricated, a source of pressure to force lubricant from said reservoir through the conduit toward the part or to forcibly return excess lubricant to the reservoir in a reverse direction through said conduit and manually operated means governing the direction of lubricant flow through said conduit.

11. A lubricating system including in combination, a lubricant reservoir, a main source of pressure adapted to act on the lubricant within said reservoir, valved means governing the flow of lubricant to and from said reservoir, and an auxiliary source of pressure adapted to increase the flow of lubricant through the reservoir or return excess lubricant to the reservoir dependent upon the condition of said valve means.

12. In a lubricating system, the combination with a part to be lubricated and a lubricant supply reservoir, of a passageway permitting lubricant flow from the supply reservoir to the part, a passageway permitting lubricant flow from the part to the supply reservoir, control means for said passageways, and a pressure pump connected with the respective passageways adapted upon its manipulation and the operation of said control means to flow the lubricant through either of the respective passageways.

13. In a lubricating system, the combination with a part to be lubricated and a lubricant supply reservoir, of a passageway permitting lubricant flow from the supply reservoir to the part, a passageway permitting lubricant flow from the part to the supply reservoir, a multiple valve controlling the flow through the respective passageways consisting of a housing, in which are located at diametrically opposite points the inlet and outlet of the respective passageways, a rotary element within the housing having a bore therein alternately connecting the inlet and outlet of each passageway, and a booster pump in constant communication with the bore of said rotary element and adapted to exert pressure on the lubricant flowing through the respective passageways.

14. In a lubricating system, the combination with a part to be lubricated, and a lubricant supply reservoir, of a source of pressure adapted to force the lubricant to said part, a chambered housing interposed between said part and reservoir, a flexible diaphragm in said housing having openings of predetermined size to permit lubricant flow but adapted to be flexed when the flow exceeds the capacity of said openings, said housing being closed against flow when the diaphragm is in flexed position, a multiple valve controlling the flow of lubricant arranged to permit flow from the reservoir to the part when in one position of adjustment and to permit reverse flow when in another position, and means to produce pressure in addition to said source of pressure constantly communicating with said valve, adapted upon operation to supplement said source of pressure and increase lubricant flow when the valve is one position and to return the excess lubricant to said reservoir when said diaphragm has closed the housing against flow and the valve is in reverse flow position.

15. In a lubricating system, the combination with a series of parts to be lubricated and a lubricant supply reservoir, of a source of pressure, acting on the lubricant within the reservoir, a pair of lubricant passageways for respectively permitting flow from the reservoir to the series of parts and vice versa, check valves in said passageways limiting the direction of flow of each, a rotary valve having a radial bore adapted when turned to different positions of adjustment to permit flow through the respective passageways, a booster pump connected with said radial bore and adapted to exert pressure on the lubricant flowing in either direction, and means associated with each part to be lubricated automatically stopping flow when the lubricant flow at such part increases beyond a predetermined degree, the adjustment of said valve to one position permitting lubricant to flow under pressure to the several parts until the flow at each is stopped and the adjustment to the other position relieving pressure at the several parts and returning excess lubricant to the reservoir under influence of said booster pump.

16. A lubricating system including, in combination, a lubricant reservoir, a source of pressure acting on the lubricant within said reservoir, a valve controlling lubricant flow from the reservoir, means to develop pressure independent of said source of pressure to augment the same, a chambered housing communicating with the reservoir through said valve and with a part to be lubricated, a flexible diaphragm in said housing unaffected by the force of the lubricant flow under influence of the first mentioned source of pressure, but adapted to be flexed under the combined influence of the first mentioned source of pressure and the independent pressure means to prevent lubricant flow to the part to be lubricated.

17. In a lubricating system, the combination with a series of parts to be lubricated, of a lubricant supply reservoir common to each part of said series, a source of pressure adapted to force the lubricant to said parts, a chambered housing associated with each part, a flexible diaphragm in said housing having openings of predetermined size permitting lubricant flow, said diaphragm being flexed when the flow exceeds the capacity of said openings to close said housing against flow, whereby when lubricant is precluded from one part the flow is directed to remaining parts of the series, a multiple valve controlling lubricant flow arranged to permit flow from the reservoir to the several parts when in one position of adjustment, and to permit reverse flow when in another position, and means to produce pressure in addition to said source of pressure constantly communicating with said valve, adapted upon operation to supplement said source of pressure and increase flow to the several parts, when said valve is in one position of adjustment and to return the excess lubricant to said reservoir when the flow is closed to all said parts, and the valve is in reverse flow position.

In testimony whereof I affix my signature.

BENJAMIN M. SMARR.